United States Patent
Kuroda et al.

(10) Patent No.: US 11,261,953 B2
(45) Date of Patent: Mar. 1, 2022

(54) GEARBOX

(71) Applicant: TOYOTA BOSHOKU KABUSHIKI KAISHA, Aichi (JP)

(72) Inventors: Yuki Kuroda, Aichi (JP); Toshiharu Kiriyama, Aichi (JP); Kenji Tatewaki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/998,497

(22) Filed: Aug. 20, 2020

(65) Prior Publication Data
US 2021/0062907 A1    Mar. 4, 2021

(30) Foreign Application Priority Data

Aug. 26, 2019  (JP) .............................. JP2019-153799

(51) Int. Cl.
| | |
|---|---|
| *F16H 9/06* | (2006.01) |
| *F16H 55/08* | (2006.01) |
| *F16H 57/02* | (2012.01) |
| *F16H 25/20* | (2006.01) |
| *F16H 1/18* | (2006.01) |
| *B60N 2/07* | (2006.01) |

(52) U.S. Cl.
CPC ............ *F16H 57/02* (2013.01); *B60N 2/0727* (2013.01); *F16H 1/18* (2013.01); *F16H 25/20* (2013.01); *F16H 2025/2031* (2013.01); *F16H 2025/2084* (2013.01); *F16H 2057/02082* (2013.01)

(58) Field of Classification Search
CPC ........... F16H 57/02; F16H 2057/02082; B60N 2/067; F16B 2/241
See application file for complete search history.

(56) References Cited

U.S. PATENT DOCUMENTS

| | | | | |
|---|---|---|---|---|
| 5,860,319 | A  * | 1/1999  | Via ...................... | B60N 2/0232 74/89.36 |
| 8,256,317 | B2 * | 9/2012  | Koga .................... | B60N 2/0705 74/425 |
| 2007/0108360 | A1* | 5/2007  | Ito .......................... | B60N 2/067 248/424 |
| 2015/0336475 | A1* | 11/2015 | Hoffmann ................ | B60N 2/06 297/344.1 |
| 2017/0009870 | A1* | 1/2017  | Hoffmann .............. | B60N 2/067 |

FOREIGN PATENT DOCUMENTS

JP          2016-49798         4/2016

* cited by examiner

*Primary Examiner* — Jake Cook

(74) *Attorney, Agent, or Firm* — Greenblum & Bernstein, P.L.C.

(57) ABSTRACT

A gearbox includes: the first helical gear; the second helical gear to engage with the first helical gear; a casing including a first member disposed in proximity to the first helical gear and a second member disposed in proximity to the second helical gear; a screw for fastening the first member with the second member, and disposed closer to the first helical gear than an engagement position between the first helical gear and the second helical gear and penetrating at least the second member; and a clip disposed closer to the second helical gear than the engagement position, and formed of a closed curve in such a manner that the first member end and the second member end are enclosed therein.

13 Claims, 12 Drawing Sheets

GEARBOX

CROSS-REFERENCE TO RELATED APPLICATIONS

This application claims the benefit of Japanese Patent Application No. 2019-153799 filed on Aug. 26, 2019 with the Japan Patent Office, the entire disclosure of which is incorporated herein by reference.

BACKGROUND

The present disclosure relates to a gearbox for a sliding device that slidably supports a vehicle seat.

For example, a gearbox disclosed in Japanese Unexamined Patent Application Publication No. 2016-49798 comprises a first helical gear, a second helical gear, and a housing for accommodating those helical gears. The housing comprises a case for supporting the two helical gears, and a cover configured to fit to the case.

SUMMARY

For example, while two helical gears are driven to rotate, as a force for mechanically restraining the rotation (hereinafter, to be referred to as a restraint torque) is applied to an output-side helical gear, a force in a direction of releasing an engagement is applied to each of the two helical gears.

In other words, when the restraint torque is applied, the two helical gears behave so as to be spaced apart from each other, and thus there may be a risk that the first helical gear and the second helical gear defectively engage with each other.

Taking the aforementioned issue into consideration, it is preferable in one aspect of the present disclosure to provide a gearbox that can reduce defective engagement of a first helical gear with a second helical gear even when a restraint torque is applied.

One mode of the present disclosure is a gearbox for a sliding device that slidably supports a seat body. The gearbox comprises: a first helical gear; a second helical gear configured to engage with the first helical gear; a casing in which the first helical gear and the second helical gear are accommodated, the casing comprising a first member disposed in proximity to the first helical gear and a second member disposed in proximity to the second helical gear; a screw for fastening the first member and the second member, the screw being disposed closer to the first helical gear than an engagement position between the first helical gear and the second helical gear, and penetrating at least the second member; and a clip for fastening the first member with the second member, the clip being disposed closer to the second helical gear than the engagement position, and formed of a closed curve in such a manner that an end portion of the first member and an end portion of the second member are enclosed therein.

This configuration of the gearbox can inhibit a deformation of the first member and the second member as to be spaced apart from each other due to a force of the restraint torque applied thereto. Specifically, the first helical gear and the second helical gear are inhibited from being spaced apart from each other even when the restraint torque is applied. This can accordingly inhibit a defective engagement between the first helical gear and the second helical gear.

In one mode of the present disclosure, the first member may be provided with a first locked portion having a projected shape to which the clip is locked. The second member may be provided with a second locked portion having a projected shape to which the clip is locked. The clip may clamp the first locked portion and the second locked portion so as to enclose the locked portions. With this configuration, the first member and the second member are securely fastened.

The clip may be made of a metal plate. This enables a secure fastening of the first member and the second member.

The clip may comprise a first protrusion that is in contact with the first locked portion and a second protrusion that is in contact with the second locked portion. With this configuration, a pressure for assembly required when the clip is assembled can be inhibited from being excessively large, and the first member and the second member can be securely fastened.

A first axis parallel to a rotation center axis of the first helical gear and a second axis parallel to a rotation center axis of the second helical gear may be perpendicular. The clip may further comprise a third protrusion and a fourth protrusion. The first protrusion and the third protrusion each may protrude in a direction parallel to the first axis, thereby being in contact with the first locked portion. The second protrusion and the fourth protrusion each may protrude in a direction parallel to the first axis, thereby being in contact with the second locked portion. A contact portion of the first protrusion with the first locked portion may be spaced apart from a contact portion of the third protrusion with the first locked portion in the second axis. A contact portion of the second protrusion with the second locked portion may be spaced apart from a contact portion of the fourth protrusion with the second locked portion in the second axis.

This configuration can inhibit a deformation of the clip, thereby securely fastening the first member and the second member.

The clip may be provided with a first non-contact portion that is not in contact with the first locked portion between the first protrusion and the third protrusion. The clip may be provided with a second non-contact portion that is not in contact with the second locked portion between the second protrusion and the fourth protrusion.

A plate thickness of the clip may be less than or equal to a projected length of the first locked portion and the second locked portion. This can inhibit an increase in size of the gearbox.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

Figure 1:
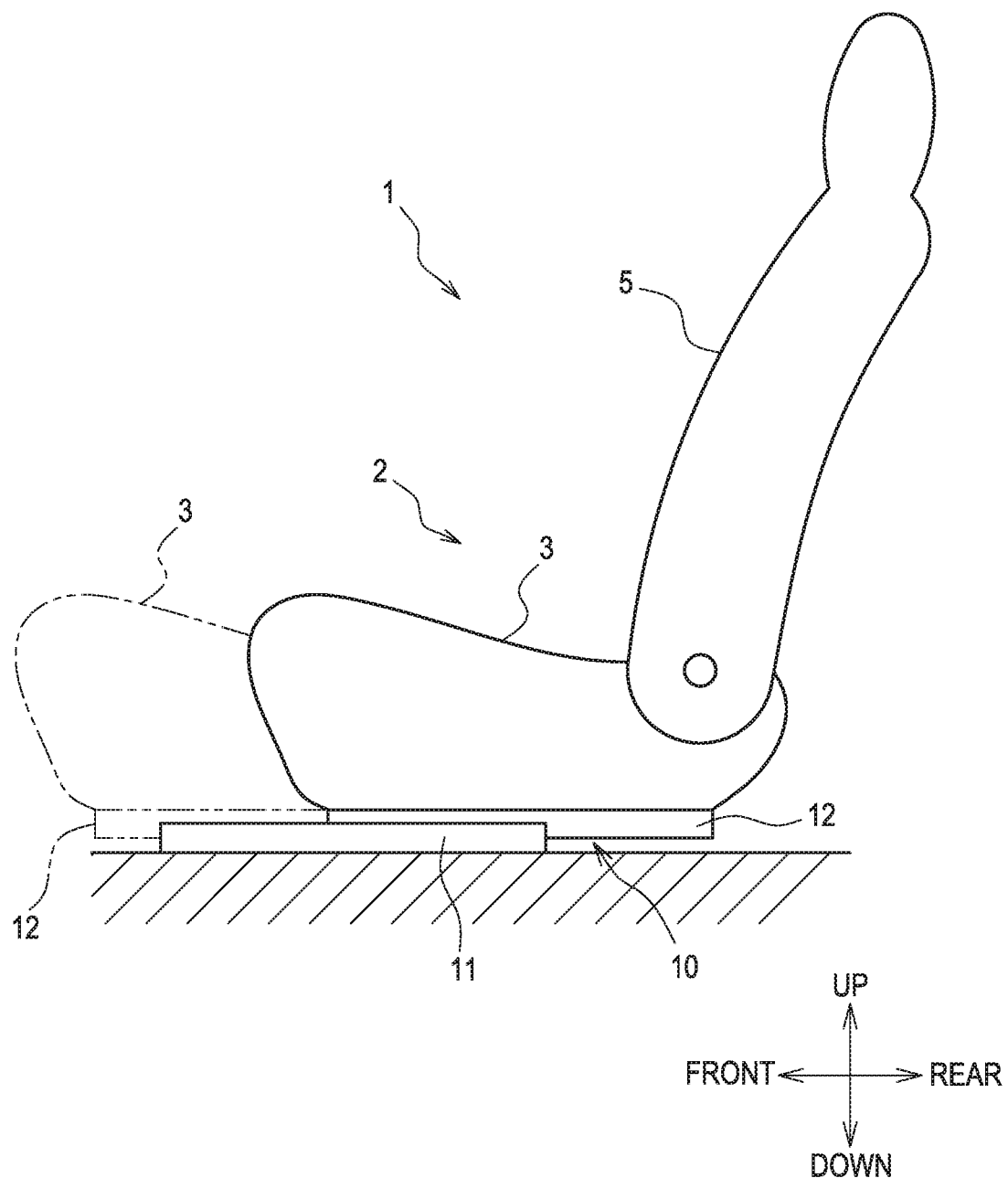
FIG. 1 is a view showing a vehicle seat according to a first embodiment.

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

The present embodiment provides a seat mounted to a vehicle such as an automobile (hereinafter, to be referred to as a vehicle seat). Arrows that indicate axes and directions and hatched lines in the drawings are made for easy understanding of relationship between the drawings or shape of a member or portion.

Thus, a gearbox according the present embodiment should not be limited by axes and directions in the drawings. Axes and directions in the drawings are defined in relation to the vehicle seat according to the present embodiment that is assembled to a vehicle. Drawings including hatched lines are not necessarily cross-section views.

At least in respect of a member or portion that is labeled with a reference numeral for explanations, there is at least one in number of such a member or portion unless the number is otherwise specified as "only one of" or the like. In other words, there may be two or more of such a member or portion when the number is not specified as "only one of" or the like. The gearbox according to the present disclosure comprises components that are at least members or portions that are labeled with reference numerals for explanations.

First Embodiment

1. Outline of Vehicle Seat

A vehicle seat 1 shown in FIG. 1 comprises at least a seat body 2 and a sliding device 10. The seat body 2 comprises a seat cushion 3 and a seatback 5.

The seat cushion 3 supports the buttocks of an occupant. The seatback 5 supports the back of the occupant. The sliding device 10 slidably supports the seat body 2.

2. Sliding Device

2.1 Outline of Sliding Device

Basic Configuration

Figure 2:
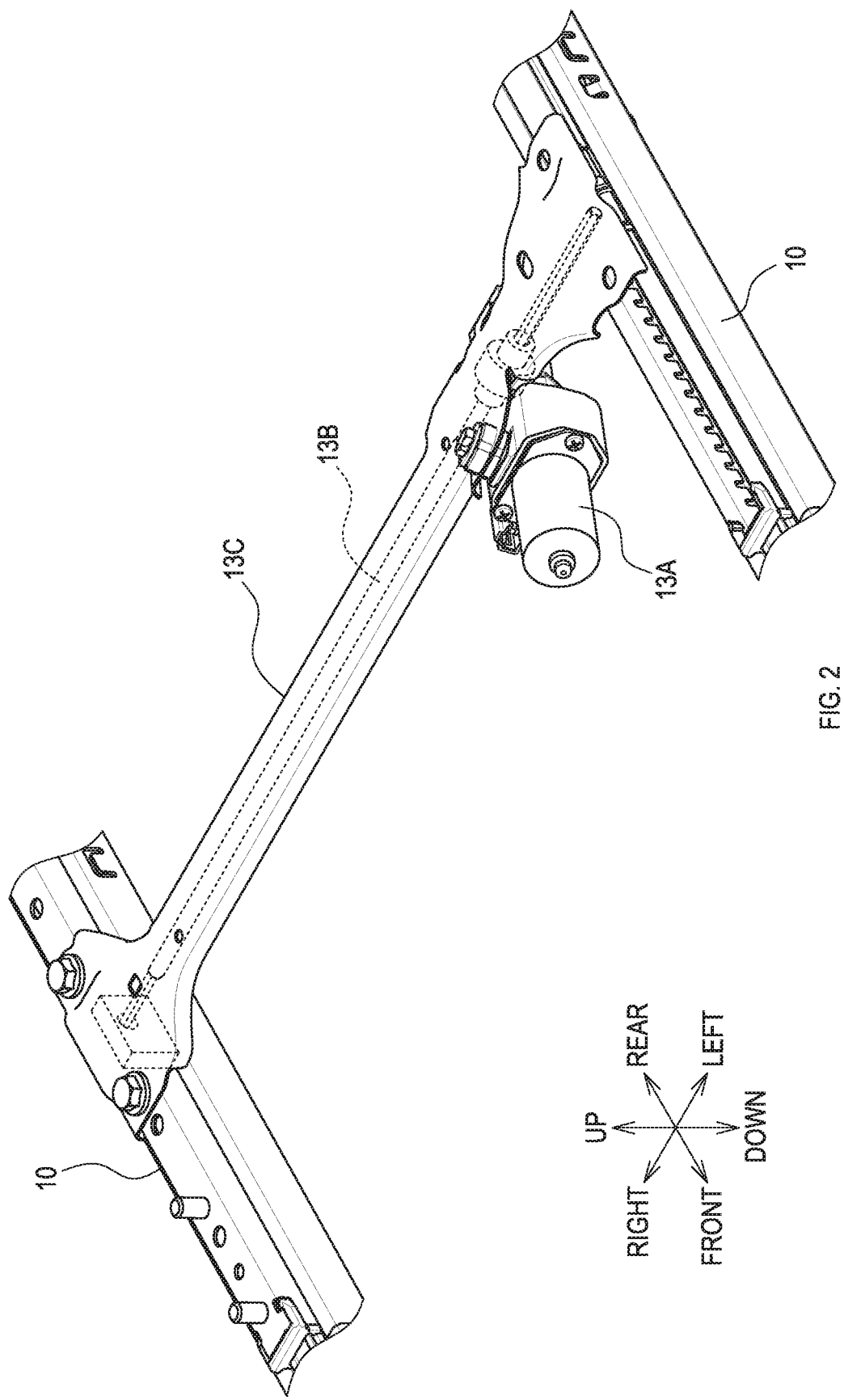
FIG. 2 is a view showing a sliding device according to the first embodiment.

The seat body 2 is supported by two sliding devices 10. As shown in FIG. 2, a first sliding device 10 of the two sliding devices 10 is disposed on one side of a seat-width axis. A second sliding device 10 of the two sliding devices 10 is disposed on another side of the seat-width axis.

The first sliding device 10 and the second sliding device 10 are configured in a substantially symmetrical manner. The description provided hereinafter explains the sliding device 10 disposed on a right side.

Figure 3:
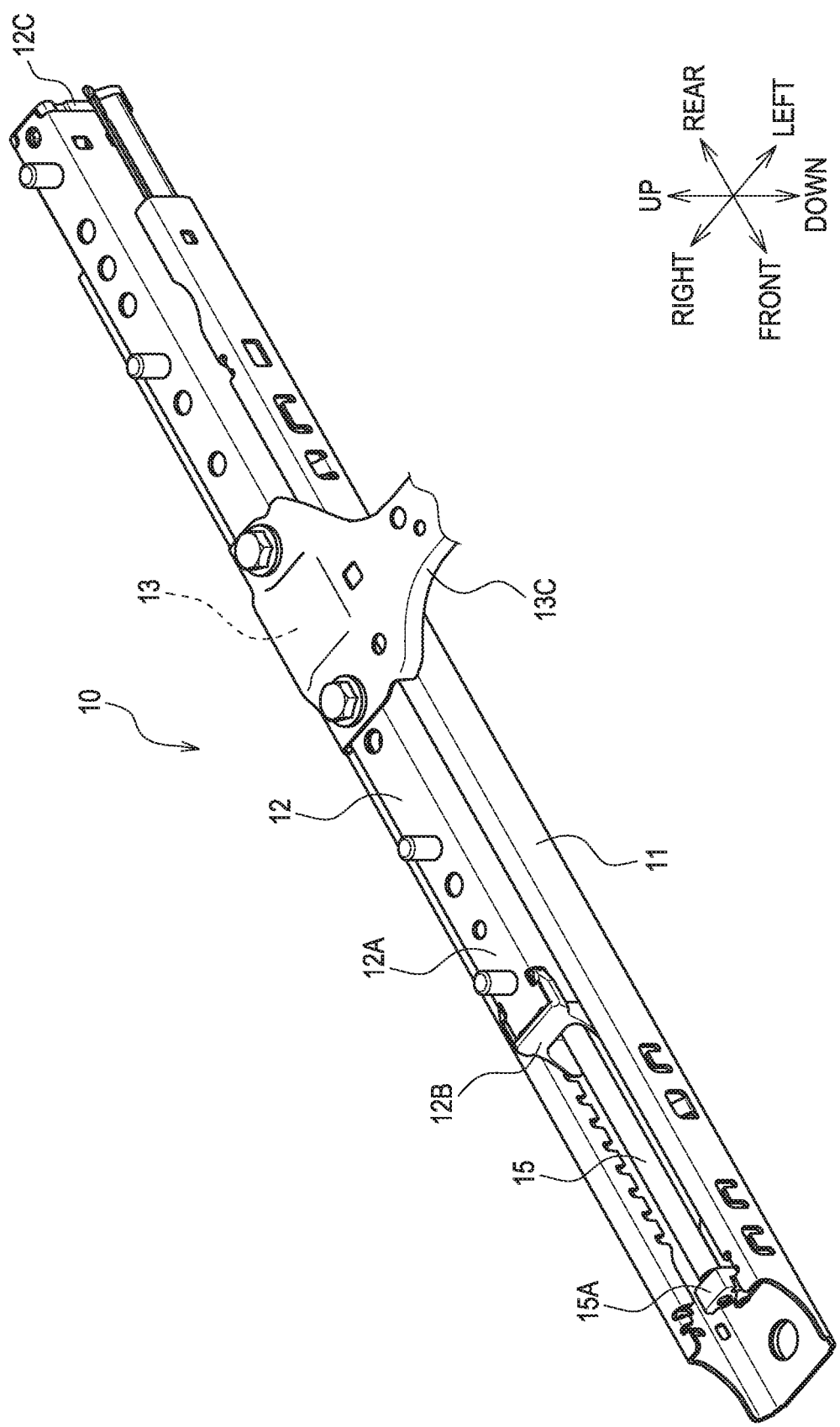
FIG. 3 is a view showing the sliding device according to the first embodiment.

The sliding device 10 comprises, as shown in FIG. 3, at least a fixed rail 11, a movable rail 12 and a sliding mechanism 13. The fixed rail 11 is a metal member directly or indirectly fixed to a vehicle.

The movable rail 12 is a member to which the seat body 2 is fixed. The movable rail 12 comprises a rail body 12A that is made of metal, and a first end cap 12B and a second end cap 12C each of which is made of resin.

The seat body 2 is fixed to the rail body 12A. The first end cap 12B is mounted to a first end of the rail body 12A along a longitudinal axis. The second end cap 12C is mounted to a second end of the rail body 12A along the longitudinal axis.

The movable rail 12 is configured slidable with respect to the fixed rail 11 along a longitudinal axis of the fixed rail 11. Specifically, the sliding device 10 slidably supports the seat body 2 along a front-rear axis of the seat. Here, the longitudinal axis of the fixed rail 11 is identical to a front-rear axis of the vehicle (automobile).

Sliding Mechanism

Figure 4:
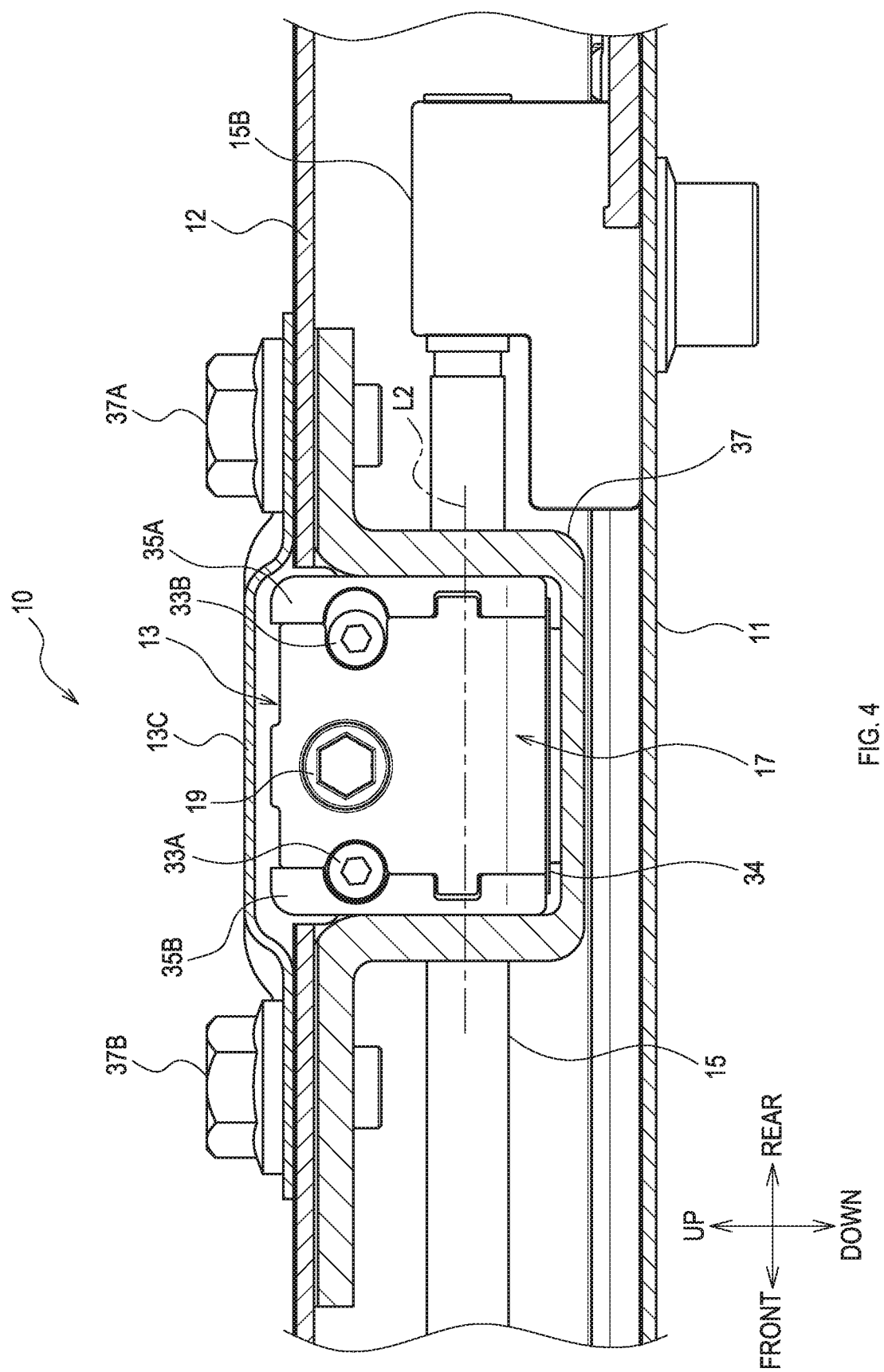
FIG. 4 is a view showing a sliding mechanism according to the first embodiment.

A sliding mechanism 13 is configured to move the movable rail 12 with respect to the fixed rail 11. The sliding mechanism 13 comprises, as shown in FIG. 4, a screw rod 15 and a gearbox 17.

The fixed rail 11 accommodates at least the screw rod 15 and retaining brackets 15A (see FIG. 3) and 15B. The screw rod 15 is a male screw extending along the longitudinal axis of the fixed rail 11. The retaining brackets 15A and 15B retain the screw rod 15.

The first retaining bracket 15A retains a first end of the screw rod 15 along an extending axis of the rod (in the present embodiment, a seat front end) (see FIG. 3). The second retaining bracket 15B retains a second end of the screw rod 15 along the extending axis of the rod (in the present embodiment, a seat rear end) (see FIG. 4).

Figure 5:
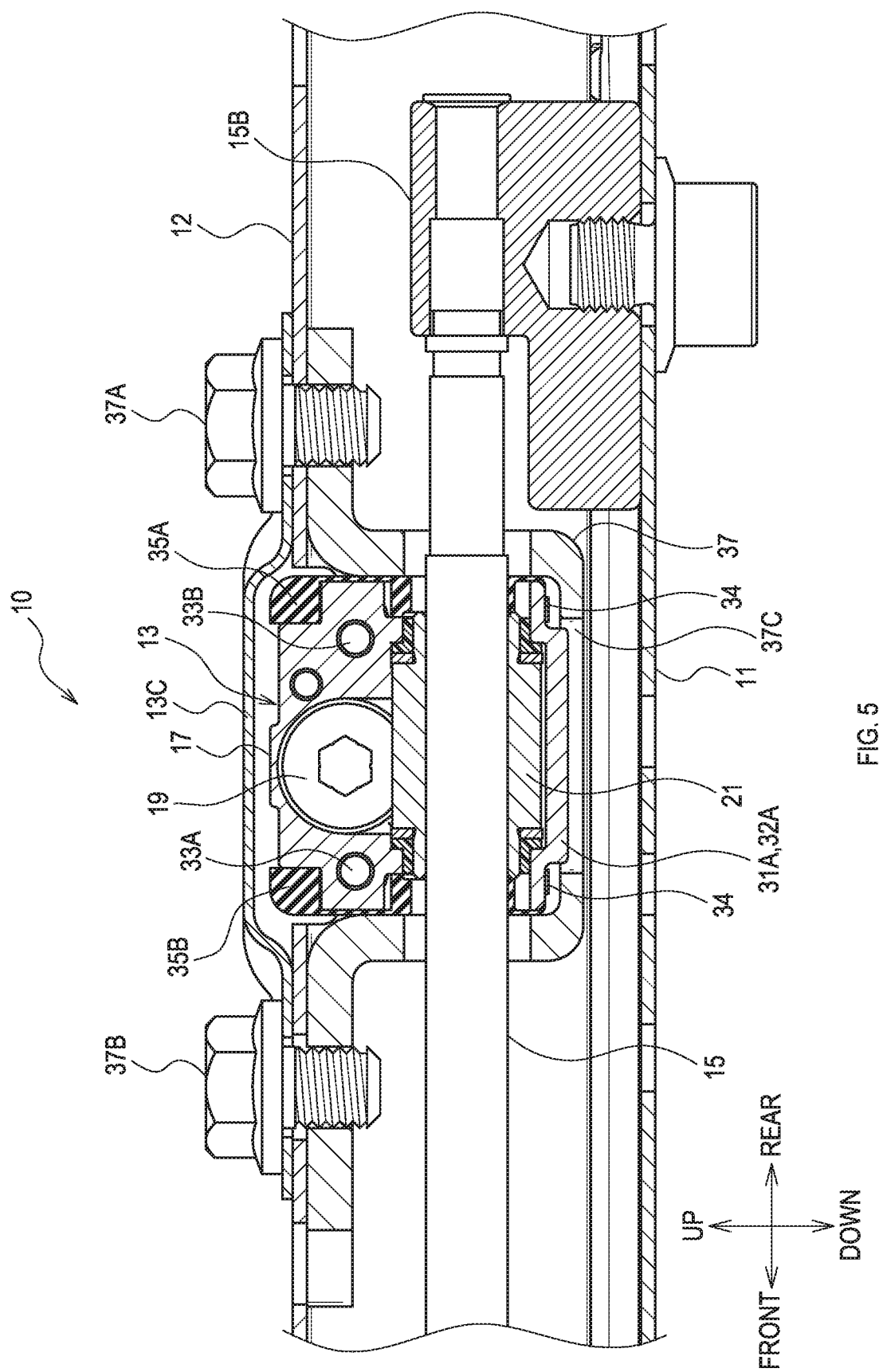
FIG. 5 is a view showing the sliding mechanism according to the first embodiment.

The gearbox 17 is retained by the movable rail 12. The gearbox 17 comprises, as shown in FIG. 5, at least a gear 19 and a nut 21. The gear 19 is a helical gear driven to rotate by a driving shaft 13B (see FIG. 2).

Figure 6:
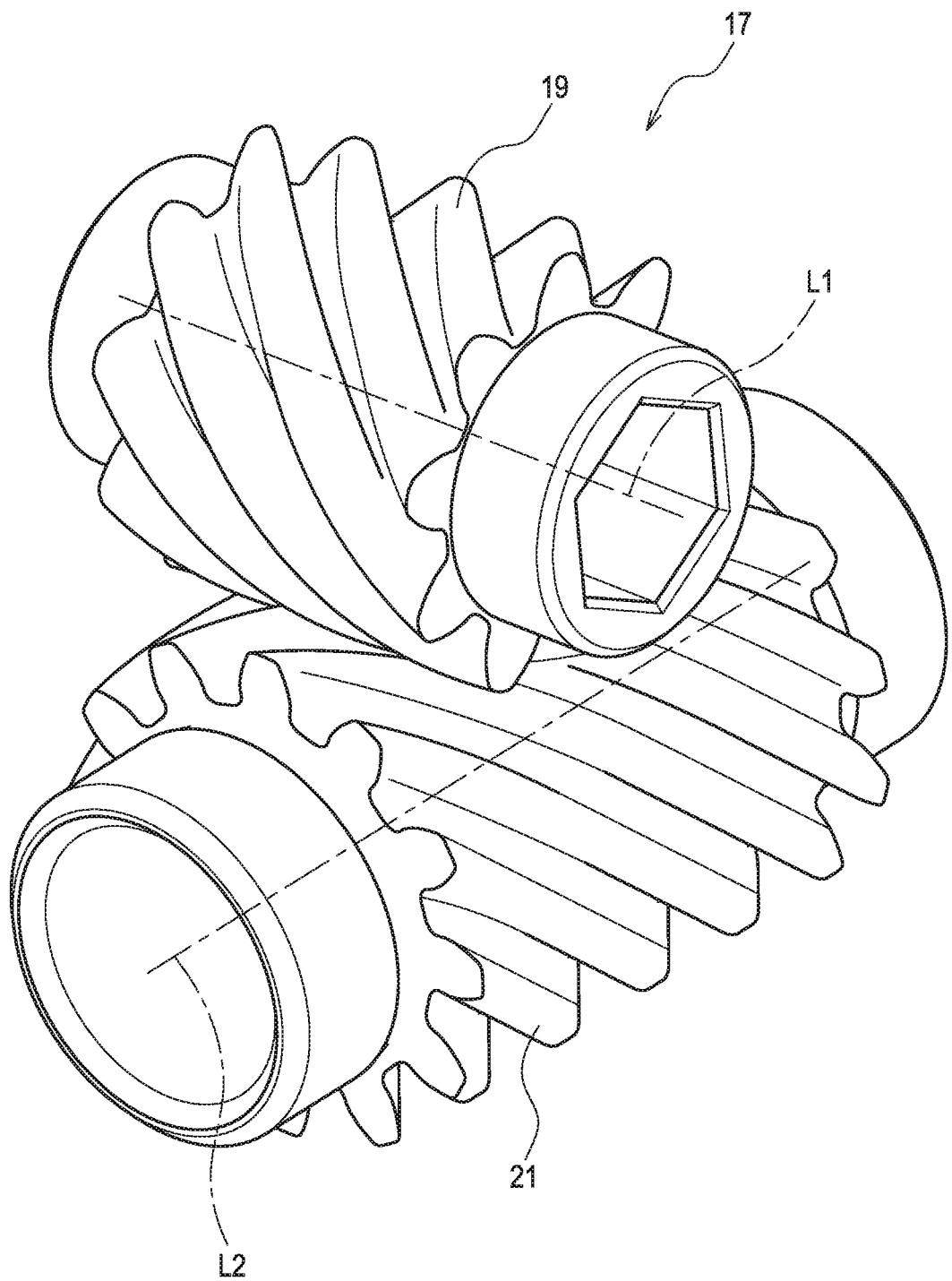
FIG. 6 is a view showing a first helical gear and a second helical gear according to the first embodiment.

As shown in FIG. 6, a helical toothed portion is formed on an outer circumferential surface of the nut 21, with which the gear 19 (hereinafter, to be referred to as a first helical gear 19) engages. A female thread (not shown in the drawings) is formed on an inner circumferential surface of the nut 21 (hereinafter, to be referred to as a second helical gear 21) with which the screw rod 15 engages.

The first helical gear 19 and the second helical gear 21 have helically formed tooth traces. Thus, gears forming the first helical gear 19 and the second helical gear 21 may be worms.

A rotation center axis L1 of the first helical gear 19 and a rotation center axis L2 of the second helical gear 21 are substantially perpendicular to each other. Thus, a direction of a rotational force transmitted from the driving shaft 13B is turned by 90 degrees at the first helical gear 19 and the second helical gear 21.

What is meant by the rotation center axis L1 and the rotation center axis L2 being substantially perpendicular to each other is that when the rotation center axis L1 and the rotation center axis L2 are projected on an imaginary plane, which is parallel to the rotation center axis L1 and the rotation center axis L2, the projected two rotation center axes are perpendicular to each other.

The driving shaft 13B rotates by receiving a rotational force from an electric motor 13A shown in FIG. 2. The electric motor 13A is fixed to a bridge portion 13C. The bridge portion 13C extends along the seat-width axis so as to be bridged between the two sliding devices 10.

A first end of the bridge portion 13C along an extending axis thereof is fixed to the movable rail 12 on a right side. A second end of the bridge portion 13C along the extending axis thereof is fixed to the movable rail 12 on a left side.

The screw rod 15 is retained as being disabled to rotate in the fixed rail 11 using the two retaining brackets 15A and 15B. With this configuration, the movable rail 12, or the seat body 2, is moved with respect to the fixed rail 11 due to a motion based on "principle of a screw" when the second helical gear 21 rotates.

2.2 Configuration of Gearbox

Outline of Gearbox

Figure 7:
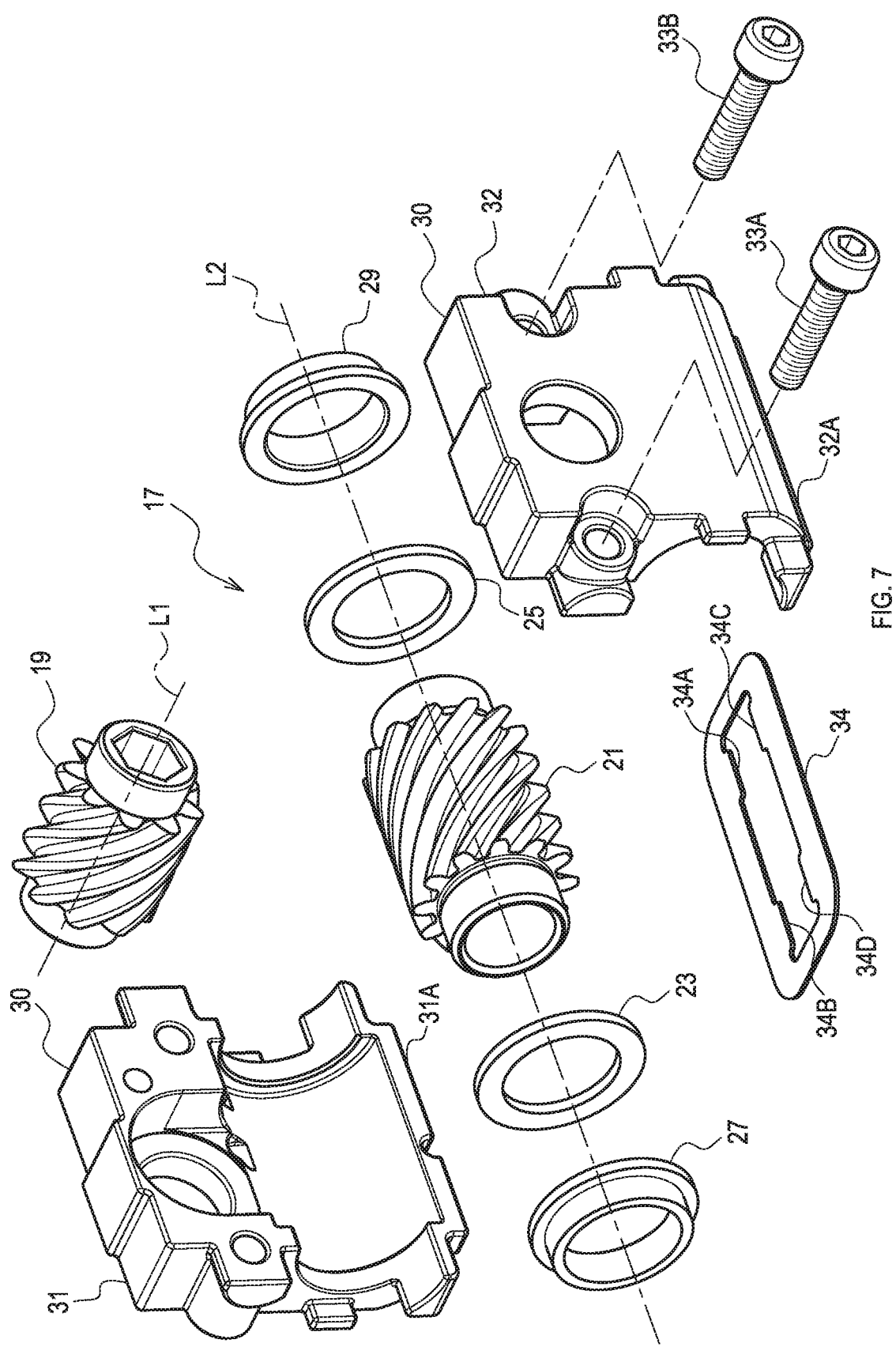
FIG. 7 is an exploded view of a gearbox according to the first embodiment.

The gearbox 17, as shown in FIG. 7, comprises at least the first helical gear 19, the second helical gear 21, a casing 30 and a clip 34. The gearbox 17 according to the present embodiment further comprises a first bearing member 23, a second bearing member 25, a third bearing member 27, and a fourth bearing member 29.

Bearing Members

The bearing members 23, 25, 27 and 29 rotatably support the second helical gear 21. The first bearing member 23 and the third bearing member 27 support a first end of the second helical gear 21 along the rotation center axis of the second helical gear 21 (a left end, in FIG. 7).

The second bearing member 25 and the fourth bearing member 29 support a second end of the second helical gear 21 along the rotation center axis of the second helical gear 21 (a right end, in FIG. 7). In the present embodiment, the first bearing member 23 and the second bearing member 25 are identical and common parts, and the third bearing member 27 and the fourth bearing member 29 are identical and common parts.

The first bearing member 23 and the second bearing member 25 are components, in the form of a flat washer, of a thrust bearing portion that receives a thrust load applied to the second helical gear 21. A thrust load is a force acting in a direction substantially parallel to the rotation center axis L2 (see FIG. 6).

The third bearing member 27 and the fourth bearing member 29 a are components, having a substantially cylindrical shape, of a radial bearing portion that receives a radial load applied to the second helical gear 21. A radial load is a force acting in a direction substantially perpendicular to the rotation center axis L2.

The second helical gear 21 according to the present embodiment is made from ferrous metal. The first bearing member 23 and the second bearing member 25 according to the present embodiment are made from a ferrous metal sheet. The third bearing member 27 and the fourth bearing member 29 according to the present embodiment are made of resin.

Casing and Fastening Structure Thereof

The first helical gear 19, the second helical gear 21 and the bearing members 23, 25, 27 and 29 are accommodated in the casing 30. The casing 30 comprises, as shown in FIG. 7, comprises a first member 31 and a second member 32.

Each of the first member 31 and the second member 32 is disposed at a position along a direction parallel to the rotation center axis L1 (hereinafter, to be also referred to as a first axis L1) so as to interpose the first helical gear 19 and the second helical gear 21 therebetween.

Specifically, the first member 31 is disposed in proximity to the first helical gear 19. The second member 32 is disposed in proximity to the second helical gear 21. The first member 31 and the second member 32 are die casting products made from aluminum or other light metal materials.

The first member 31 and the second member 32 are coupled with each other by fastening at least one screw (two screws, namely a first screw 33A and a second screw 33B, in the present embodiment). The screws 33A and 33B each are in the form of a bolt extending along a direction parallel to the first axis L1.

Figure 8:
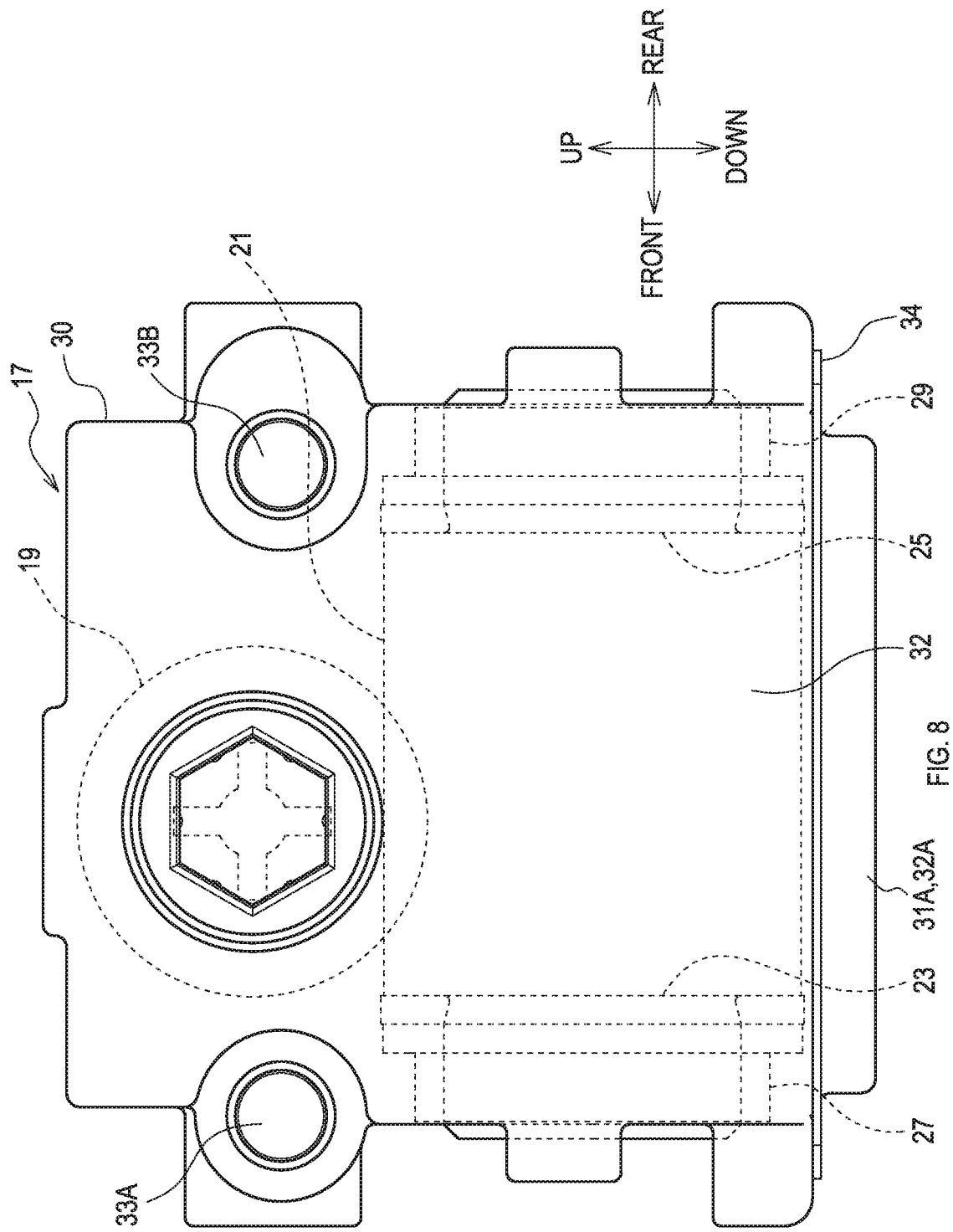
FIG. 8 is a view showing the gearbox according to the first embodiment.

The two screws 33A and 33B, as shown in FIG. 8, are disposed closer to the first helical gear 19 than an engagement position between the first helical gear 19 and the second helical gear 21, and penetrate at least the second member 32 (see FIG. 7).

In the present embodiment, the first screw 33A, as shown in FIG. 8, is disposed on an opposite side to the second screw 33B, having the first helical gear 19 interposed therebetween along a direction parallel to the rotation center axis L2 (hereinafter, to be also referred to as a second axis L2).

Figure 9:
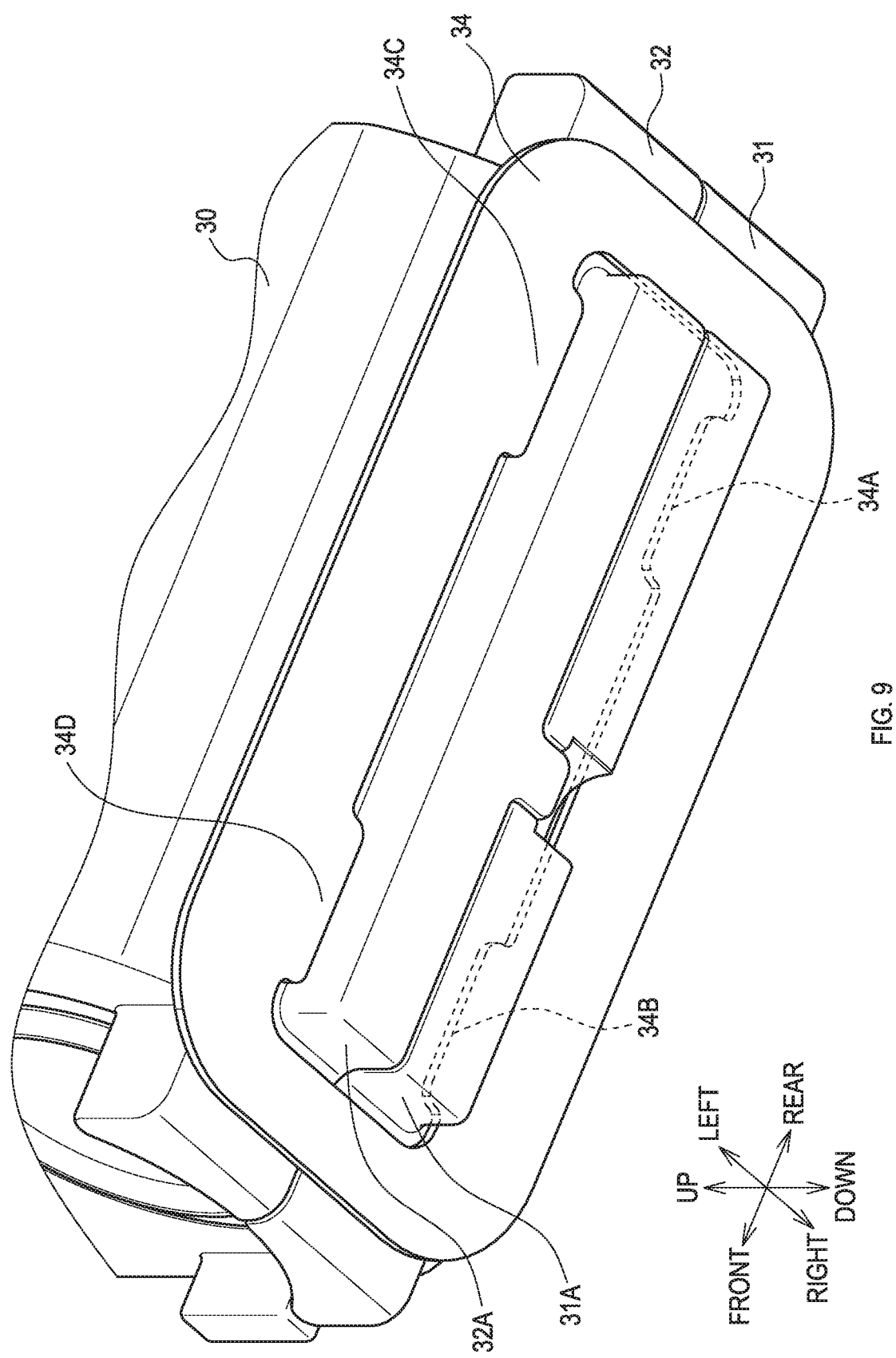
FIG. 9 is a view showing the gearbox according to the first embodiment.

The clip 34 is disposed closer to the second helical gear 21 than the engagement position, and fastens the first member 31 and the second member 32. Specifically, as shown in FIG. 9, the clip 34 is formed of a closed curve (rectangular-shaped, in the present embodiment) in such a manner that an end portion of the first member 31 and an end portion of the second member 32 are enclosed therein.

That is, the end portion of the first member 31 (lower end, in the present embodiment) is provided with a first locked portion 31A, which has a projected shape. The end portion of the second member 32 (lower end, in the present embodiment) is provided with a second locked portion 32A, which has a projected shape.

The clip 34 is locked with the first locked portion 31A and the second locked portion 32A in such a manner that the clip 34 clamps the locked portions 31A and 32A so as to enclose the locked portions. The first locked portion 31A and the second locked portion 32A according to the present embodiment are in the form of a projection extending along the second axis.

Figure 10:
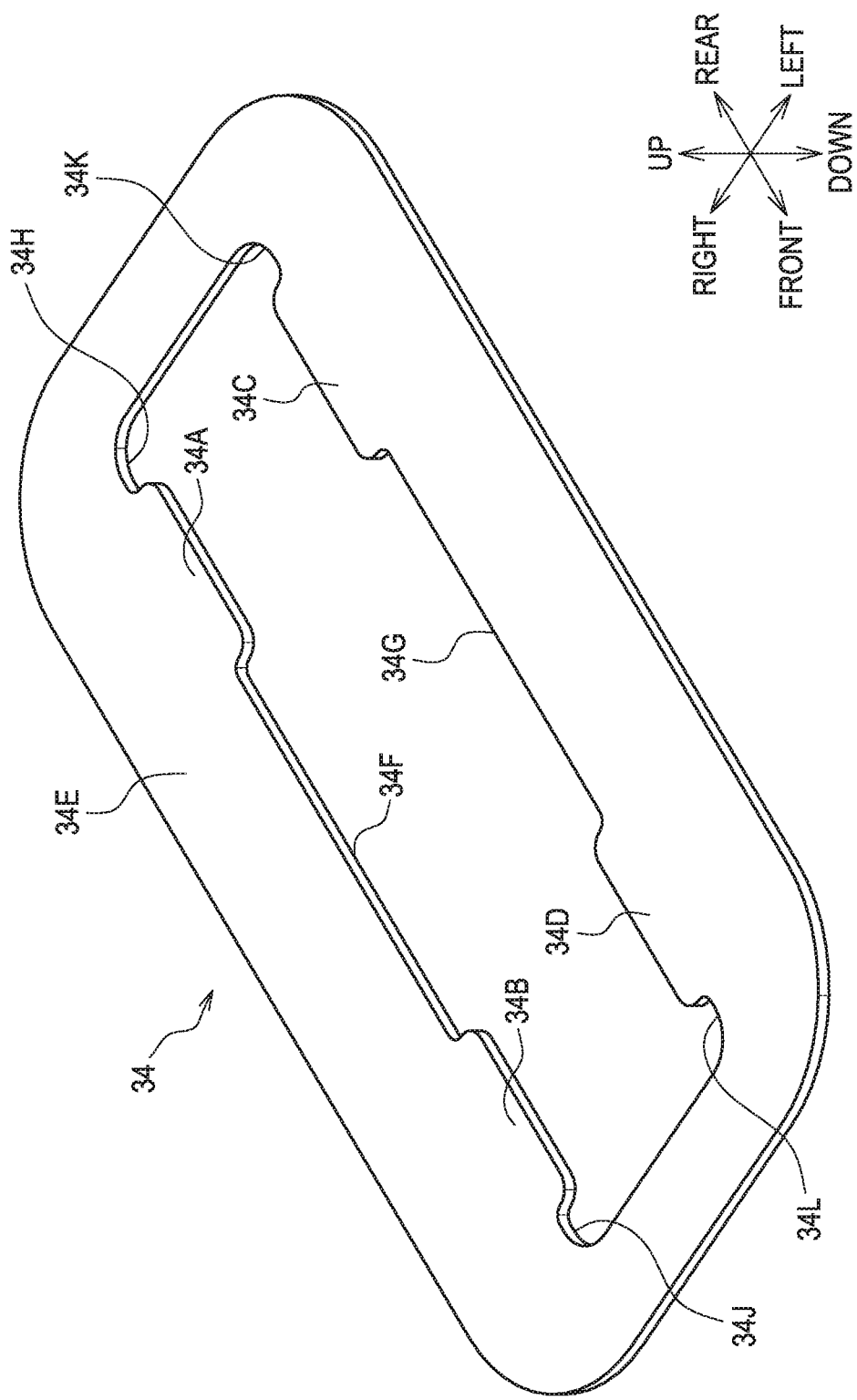
FIG. 10 is a view showing a clip according to the first embodiment.

The clip 34, as shown in FIG. 10, is provided with a first protrusion 34A, a third protrusion 34B, a second protrusion 34C, and a fourth protrusion 34D.

Figure 11:
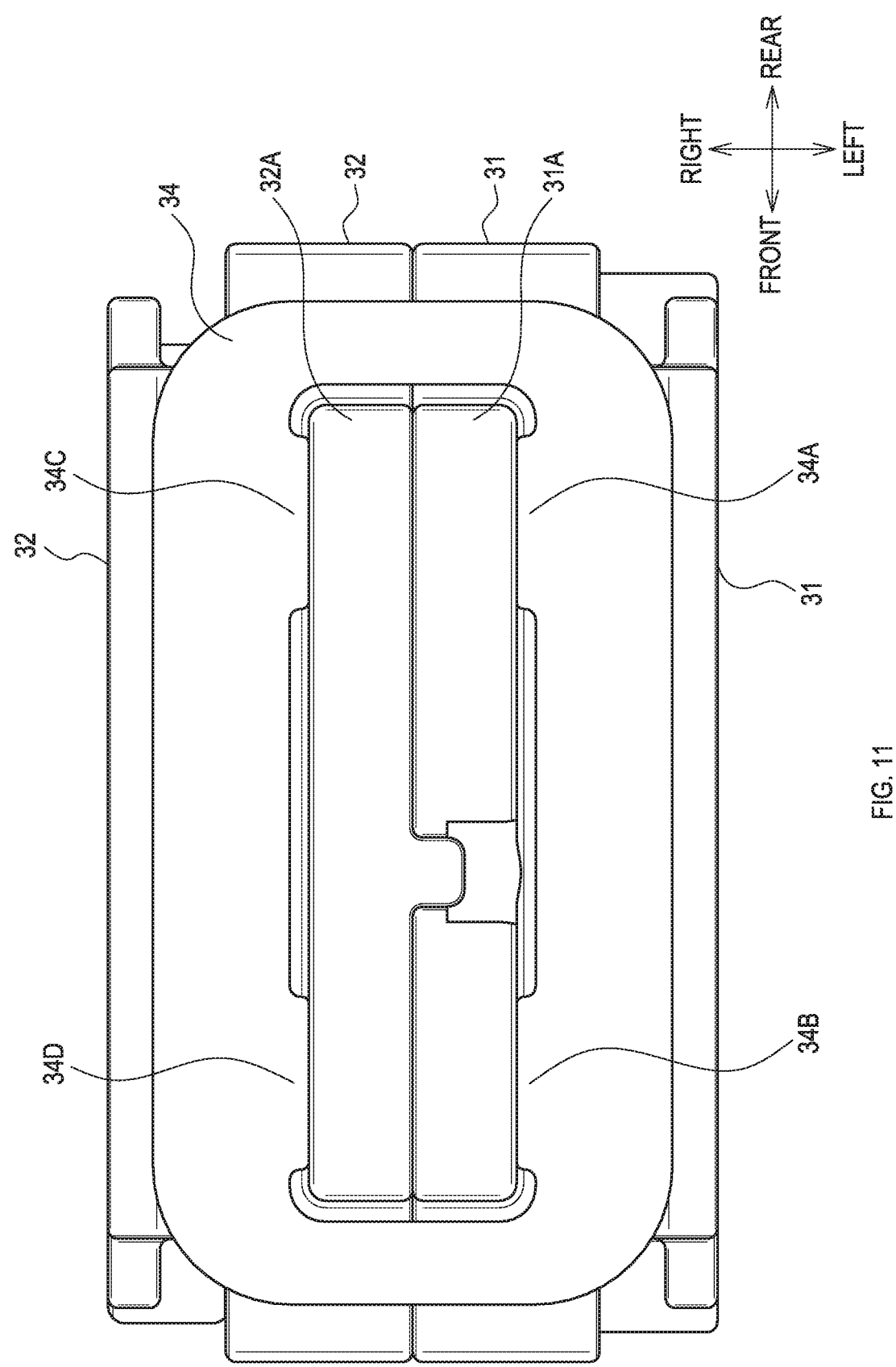
FIG. 11 is a view showing the gearbox according to the first embodiment.

The first protrusion 34A and the third protrusion 34B, as shown in FIG. 11, each protrude in a direction parallel to the first axis, and are in contact with the first locked portion 31A. The second protrusion 34C and the fourth protrusion 34D each protrude in a direction parallel to the first axis, and are in contact with the second locked portion 32A. Here, the first protrusion 34A and the third protrusion 34B each protrude in the direction opposite to the direction in which the second protrusion 34C and the fourth protrusion 34D each protrude.

An area of the first protrusion 34A contacting with the first locked portion 31A is spaced apart from an area of the third protrusion 34B contacting with the first locked portion 31A along the second axis. An area of the second protrusion 34C contacting with the second locked portion 32A is spaced apart from an area of the fourth protrusion 34D contacting with the second locked portion 32A along the second axis.

The clip 34, as shown in FIG. 10, is formed from a metal plate. The first protrusion 34A, the third protrusion 34B, the second protrusion 34C, and the fourth protrusion 34D are integrally formed from the metal plate together with a rectangle-frame shaped portion 34E.

The clip 34 is provided with a first non-contact portion 34F, which is not in contact with the first locked portion 31A, between the first protrusion 34A and the third protrusion 34B. The clip 34 is also provided with a second non-contact portion 34G, which is not in contact with the second locked portion 32A, between the second protrusion 34C and the fourth protrusion 34D.

In a state that the clip 34 is mounted to the locked portions 31A and 32A, the protrusions 34A to 34D are slightly deformed to get in pressure contact with the first locked portion 31A and the second locked portion 32A as if the tips of the protrusions 34A to 34D bit into the locked portions 31A and 32A.

For this reason, non-contact portions 34H, 34J, 34K, and 34L having an indented shape are provided at four corners of the rectangle-frame shaped portion 34E. These non-contact portions 34H to 34L are provide for a purpose of reducing stress concentration generated in the four corners when the clip 34 is mounted to the locked portions 31A and 32A.

Figure 12:
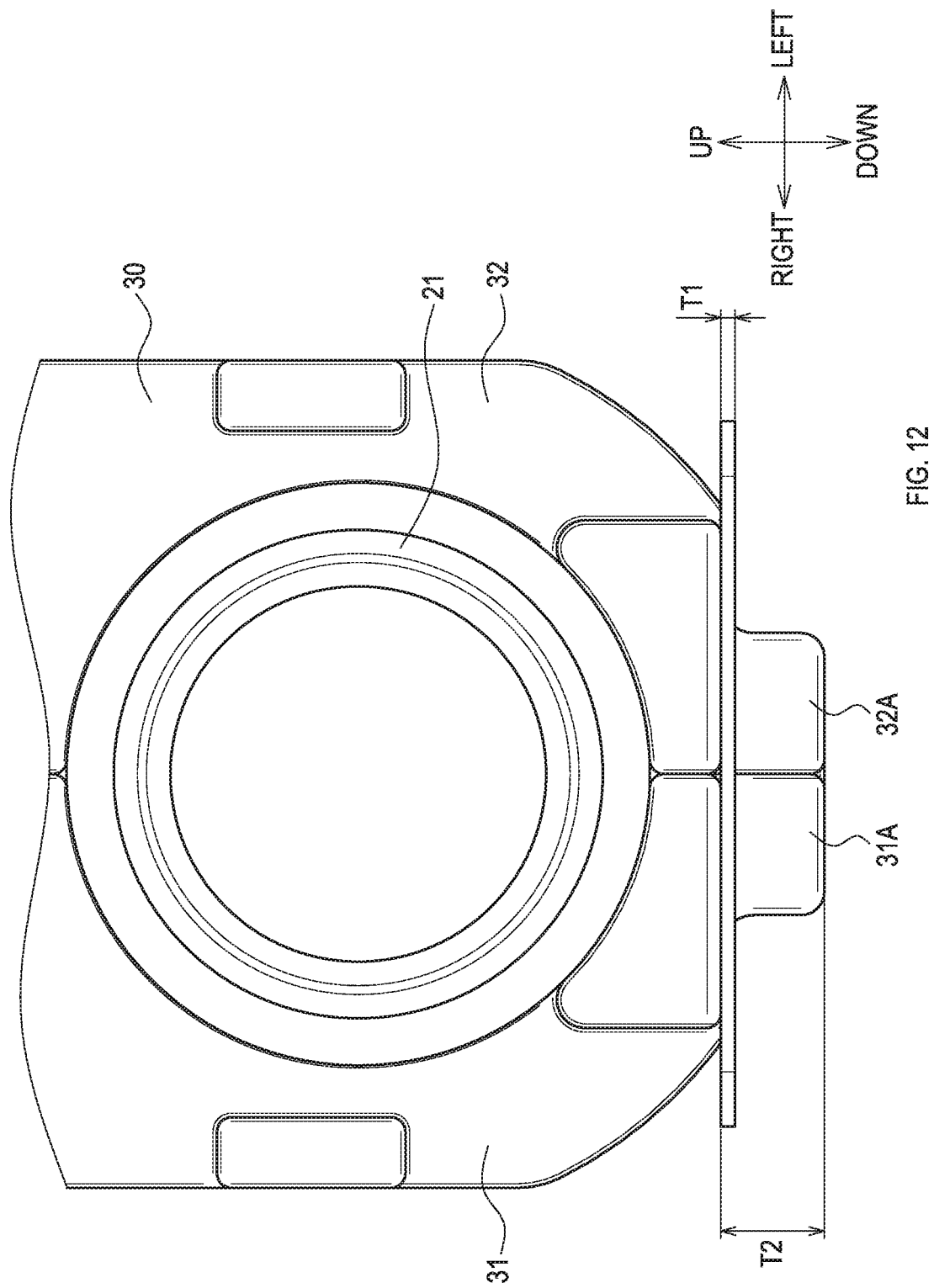
FIG. 12 is a view showing the gearbox according to the first embodiment.

As shown in FIG. 12, a plate thickness T1 of the clip 34 is less than or a projected length T2 of the first locked portion 31A and the second locked portion 32A. In the present embodiment, the projected length of the first locked portion 31A and the projected length of the second locked portion 32A are equal.

2.3 Other Configurations

The first helical gear 19 is made of resin. A shaft of the first helical gear 19 is supported by the first member 31 and the second member 32 so as to make a sliding contact with those members. Specifically, a contact portion between the casing 30 and the shaft functions as a bearing portion to rotatably support the first helical gear 19.

The gearbox 17, as shown in FIG. 5, is retained in a bracket 37 in such a manner that the gearbox 17 is interposed between rubber-made dampers 35A and 35B along a sliding axis. The bracket 37 is fixed to the movable rail 12 with bolts 37A and 37B.

The first locked portion 31A and the second locked portion 32A are fitted into a recessed portion 37C provided in the bracket 37. The recessed portion 37C according to the present embodiment is formed in a through hole provided in the bracket 37.

3. Features of Gearbox According to the Present Embodiment

In the gearbox 17 according to the present embodiment, the screws 33A and 33B for fastening the first member 31 and the second member 32 are provided closer to the first helical gear 19 than the engagement position between the first helical gear 19 and the second helical gear 21. Also, the clip 34 for fastening the first member 31 and the second member 32 is provided closer to the second helical gear 21 than the engagement position.

This configuration of the gearbox 17 can inhibit a deformation of the first member 31 and the second member 32 so as to be spaced apart from each other due to a restraint torque applied thereto. In other words, the first helical gear 19 and the second helical gear 21 can be inhibited from being spaced apart from each other even when a restraint torque is applied. This can accordingly inhibit a defective engagement between the first helical gear 19 and the second helical gear 21.

The clip 34 clamps the first locked portion 31A and the second locked portion 32A so as to enclose the locked portions, each having a projected shape. With this configuration, the first member 31 and the second member 32 are securely fastened. This further surely inhibit a defective engagement.

The clip 34 is made of a metal plate. With this configuration, for example, the first member 31 and the second member 32 can be fastened more securely than a case where the clip 34 is made of a resin plate.

The clip 34 comprises the first protrusion 34A, the third protrusion 34B, the second protrusion 34C and the fourth protrusion 34D. With this configuration, a pressure for assembly required when the clip 34 is assembled can be inhibited from being large.

That is, if any protrusions are not provided, and an entire inner circumference of the rectangle-frame shaped portion 34E is in contact with the first locked portion 31A and the second locked portion 32A, the pressure for assembly required when the clip 34 is assembled is large.

In contrast, the clip 34 according to the present embodiment is provided with the protrusions, whereby the pressure for assembly is inhibited from being large, and the first member 31 and the second member 32 are securely fastened.

If the first protrusion 34A is in contact with a center of the first locked portion 31A along the second axis, the second protrusion 34C is in contact with a center of the second locked portion 32A along the second axis, and the third protrusion 34B and the fourth protrusion 34D are not provided, there is a high possibility that the rectangle-frame shaped portion 34E is largely deformed along the first axis.

In contrast, in the present embodiment, the first protrusion 34A and the third protrusion 34B are spaced apart from each other along the second axis, and the second protrusion 34C and the fourth protrusion 34D are spaced apart from each other along the second axis.

Thus, a large pressure is hardly applied to a center of the rectangle-frame shaped portion 34E along the second axis, the clip 34 (rectangle-frame shaped portion 34E) is accordingly inhibited from being deformed in the first axis, and the first member 31 and the second member 32 are securely fastened.

The clip 34 is provided with the first non-contact portion 34F, which is not in contact with the first locked portion 31A between the first protrusion 34A and the third protrusion 34B. The clip 34 is also provided with the second non-contact portion 34G, which is not in contact with the second locked portion 32A between the second protrusion 34C and the fourth protrusion 34D.

This configuration can surely inhibit a large pressure from being applied to the rectangle-frame shaped portion 34E at the center along the second axis. This can further inhibit the clip 34 (rectangle-frame shaped portion 34E) from being largely deformed along the first axis, and therefore the first member 31 and the second member 32 are securely fastened.

The plate thickness T1 of the clip 34 is less than or equal to the projected length T2 of the first locked portion 31A and the second locked portion 32A. With this configuration, the gearbox 17 according to the present embodiment is inhibited from being increased in size.

Other Embodiments

For example, the rotation center axis L1 of the first helical gear 19 and the rotation center axis L2 of the second helical gear 21 may be parallel.

For example, the clip 34 may have a square-frame shape, hexagonal-frame shape, or oval-frame shape.

For example, the clip 34 may be made of a resin plate or a wire.

For example, the clip 34 may comprise only the first protrusion and the second protrusion. The clip 34 may also not be provided with any protrusions, and the entire inner circumference of the rectangle-frame shaped portion 34E may be in contact with the first locked portion 31A and the second locked portion 32A.

With respect to a clip provided with only the first protrusion 34A and the second protrusion 34C, the first protrusion 34A may be in contact with the center of the first locked portion 31A along the second axis, and the second protrusion 34C may be in contact with the center of the second locked portion 32A along the second axis.

For example, the plate thickness T1 of the clip 34 may be greater than the projected length T2 of the first locked portion 31A and the second locked portion 32A.

The present disclosure may be also applied to seats for vehicles, such as railroad vehicles, ships and boats and aircrafts, and to stationary seats used in theaters or for household use.

Furthermore, the present disclosure may be embodied in various forms within the purpose of the invention described in the claims, and the present disclosure is not limited to the aforementioned embodiments. Accordingly, it may be possible to employ a configuration obtained by combining at least two embodiments among the aforementioned embodiments, or a configuration obtained by removing a constituent feature of the invention described in the embodiments.

What is claimed is:

1. A gearbox for a sliding devise that slidably supports a seat body, the gearbox comprising:
    a first helical gear;
    a second helical gear configured to engage with the first helical gear;
    a casing in which the first helical gear and the second helical gear are accommodated, the casing comprising a first member disposed in proximity to the first helical gear, and a second member disposed in proximity to the second helical gear;
    a screw configured to fasten the first member and the second member, the screw being disposed closer to the first helical gear than an engagement position between the first helical gear and the second helical gear, and penetrating at least the second member; and
    a clip configured to fasten the first member and the second member, the clip being disposed closer to the second helical gear than the engagement position, and including a closed curve that encloses an end portion of the first member and an end portion of the second member,
    wherein an area inside the closed curve of the clip does not overlap with the second helical gear when viewed in an axial direction of the second helical gear.

2. The gearbox according to claim 1,
    wherein the first member is provided with a first locked portion having a projected shape to which the clip is locked,
    wherein the second member is provided with a second locked portion having a projected shape to which the clip is locked, and
    wherein the clip clamps the first locked portion and the second locked portion so as to enclose the locked portions.

3. The gearbox according to claim 2,
    wherein the clip is made of a metal plate.

4. The gearbox according to claim 2,
    wherein the clip comprises a first protrusion that is in contact with the first locked portion and a second protrusion that is in contact with the second locked portion.

5. The gearbox according to claim 4,
    wherein a first axis parallel to a rotation center axis of the first helical gear, and a second axis parallel to a rotation center axis of the second helical gear are perpendicular,
    wherein the clip further comprises a third protrusion and a fourth protrusion,
    wherein the first protrusion and the third protrusion each protrude in a direction parallel to the first axis, and being in contact with the first locked portion,
    wherein the second protrusion and the fourth protrusion each protrude in a direction parallel to the first axis, and being in contact with the second locked portion,
    wherein a contact portion of the first protrusion with the first locked portion is spaced apart from a contact portion of the third protrusion with the first locked portion in the second axis, and
    wherein a contact portion of the second protrusion with the second locked portion is spaced apart from a contact portion of the fourth protrusion with the second locked portion in the second axis.

6. The gearbox according to claim 5,
    wherein the clip is provided with a first non-contact portion that is not in contact with the first locked portion between the first protrusion and the third protrusion, and
    wherein the clip is provided with a second non-contact portion that is not in contact with the second locked portion between the second protrusion and the fourth protrusion.

7. The gearbox according to claim 3,
    wherein a plate thickness of the clip is less than or equal to a projected length of the first locked portion and the second locked portion.

8. A gearbox for a sliding devise that slidably supports a seat body, the gearbox comprising:
    a first helical gear;
    a second helical gear configured to engage with the first helical gear;
    a casing in which the first helical gear and the second helical gear are accommodated, the casing comprising a first member disposed in proximity to the first helical gear, and a second member disposed in proximity to the second helical gear;
    two screws configured to fasten the first member and the second member, the two screws being disposed closer to the first helical gear than an engagement position between the first helical gear and the second helical gear, and penetrating at least the second member; and
    a clip configured to fasten the first member and the second member, the clip being disposed closer to the second helical gear than the engagement position, and including a closed curve that encloses an end portion of the first member and an end portion of the second member,
    wherein the clip has a fifth protrusion and a sixth protrusion respectively facing one and the other of the two screws.

9. The gearbox according to claim 8,
    wherein the first member is provided with a first locked portion having a projected shape to which the clip is locked, wherein the second member is provided with a second locked portion having a projected shape to which the clip is locked, and wherein the clip clamps the first locked portion and the second locked portion so as to enclose the first and second locked portions.

10. The gearbox according to claim 9,
wherein the clip is made of a metal plate.

11. The gearbox according to claim 8,
wherein a first axis parallel to a rotation center axis of the first helical gear, and a second axis parallel to a rotation center axis of the second helical gear are perpendicular to each other, wherein the clip further comprises a seventh protrusion and an eighth protrusion, wherein the fifth protrusion and the sixth protrusion each protrude in a direction parallel to the first axis, and being in contact with the first locked portion, wherein the seventh protrusion and the eighth protrusion each protrude in a direction parallel to the first axis, and being in contact with the second locked portion, wherein a contact portion of the fifth protrusion with the first locked portion is spaced apart from a contact portion of the sixth protrusion with the first locked portion in the second axis, and wherein a contact portion of the seventh protrusion with the second locked portion is spaced apart from a contact portion of the eighth protrusion with the second locked portion in the second axis.

12. The gearbox according to claim 11,
wherein the clip is provided with a first non-contact portion that is not in contact with the first locked portion between the fifth protrusion and the sixth protrusion, and wherein the clip is provided with a second non-contact portion that is not in contact with the second locked portion between the seventh protrusion and the eighth protrusion.

13. The gearbox according to claim 10,
wherein a plate thickness of the clip is less than or equal to a projected length of the first locked portion and the second locked portion.

* * * * *